United States Patent
Tota

(10) Patent No.: US 9,729,212 B1
(45) Date of Patent: Aug. 8, 2017

(54) RADIO APPARATUS AND RECEIVING METHOD

(71) Applicant: FUJITSU LIMITED, Kawasaki-shi, Kanagawa (JP)

(72) Inventor: Kazuyuki Tota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/356,768

(22) Filed: Nov. 21, 2016

(30) Foreign Application Priority Data

Jan. 28, 2016 (JP) .................................. 2016-014851

(51) Int. Cl.
| | |
|---|---|
| *H04B 17/02* | (2006.01) |
| *H04B 7/0404* | (2017.01) |
| *H04W 52/52* | (2009.01) |
| *H04B 7/0413* | (2017.01) |
| *H04W 88/06* | (2009.01) |

(52) U.S. Cl.
CPC ......... *H04B 7/0404* (2013.01); *H04B 7/0413* (2013.01); *H04W 52/52* (2013.01); *H04W 88/06* (2013.01)

(58) Field of Classification Search
CPC . H04W 52/52; H04W 88/06; H04W 52/3465; H04W 2/17
USPC .................. 455/69, 522, 245.1, 132, 138
See application file for complete search history.

(56) References Cited

U.S. PATENT DOCUMENTS

| | | | |
|---|---|---|---|
| 2003/0081694 A1* | 5/2003 | Wieck .................. | H03G 1/0088 375/316 |
| 2013/0109433 A1* | 5/2013 | Wang ..................... | H04B 1/525 455/552.1 |
| 2014/0286458 A1 | 9/2014 | Sasaki et al. | |

FOREIGN PATENT DOCUMENTS

| | | |
|---|---|---|
| JP | 10-510965 | 10/1998 |
| JP | 2014-187428 | 10/2014 |
| WO | 96019048 | 6/1996 |

\* cited by examiner

*Primary Examiner* — Tu X Nguyen
(74) *Attorney, Agent, or Firm* — Fujitsu Patent Center

(57) ABSTRACT

A radio apparatus includes a first antenna that transmits and receives a radio signal, a second antenna that receives a radio signal, a plurality of filters that acquire signals with mutually different frequencies from a received signal that is received by the second antenna, an amplification unit that is arranged in front of the plurality of filters and amplifies the received signal, and a control unit that controls whether or not the received signal is amplified by the amplification unit depending on a condition of radio communication by the first antenna and the second antenna.

8 Claims, 9 Drawing Sheets

FIG.5

| TRANSMISSION POWER | MIMO | CA | P CELL CON-NECTION | SWITCH 153H | SWITCH 153L |
|---|---|---|---|---|---|
| 23.0 dBm TO 0 dBm | OFF | OFF | - | ON (BYPASS) | ON (BYPASS) |
| | ON | OFF | - | ON (BYPASS) | ON (BYPASS) |
| | ON | ON | HIGH-FRE-QUENCY BAND | ON (BYPASS) | OFF |
| | ON | ON | LOW-FRE-QUENCY BAND | OFF | ON (BYPASS) |
| 0 dBm OR LESS | OFF | OFF | - | OFF | OFF |
| | ON | OFF | - | OFF | OFF |
| | ON | ON | HIGH-FRE-QUENCY BAND | OFF | OFF |
| | ON | ON | LOW-FRE-QUENCY BAND | OFF | OFF |

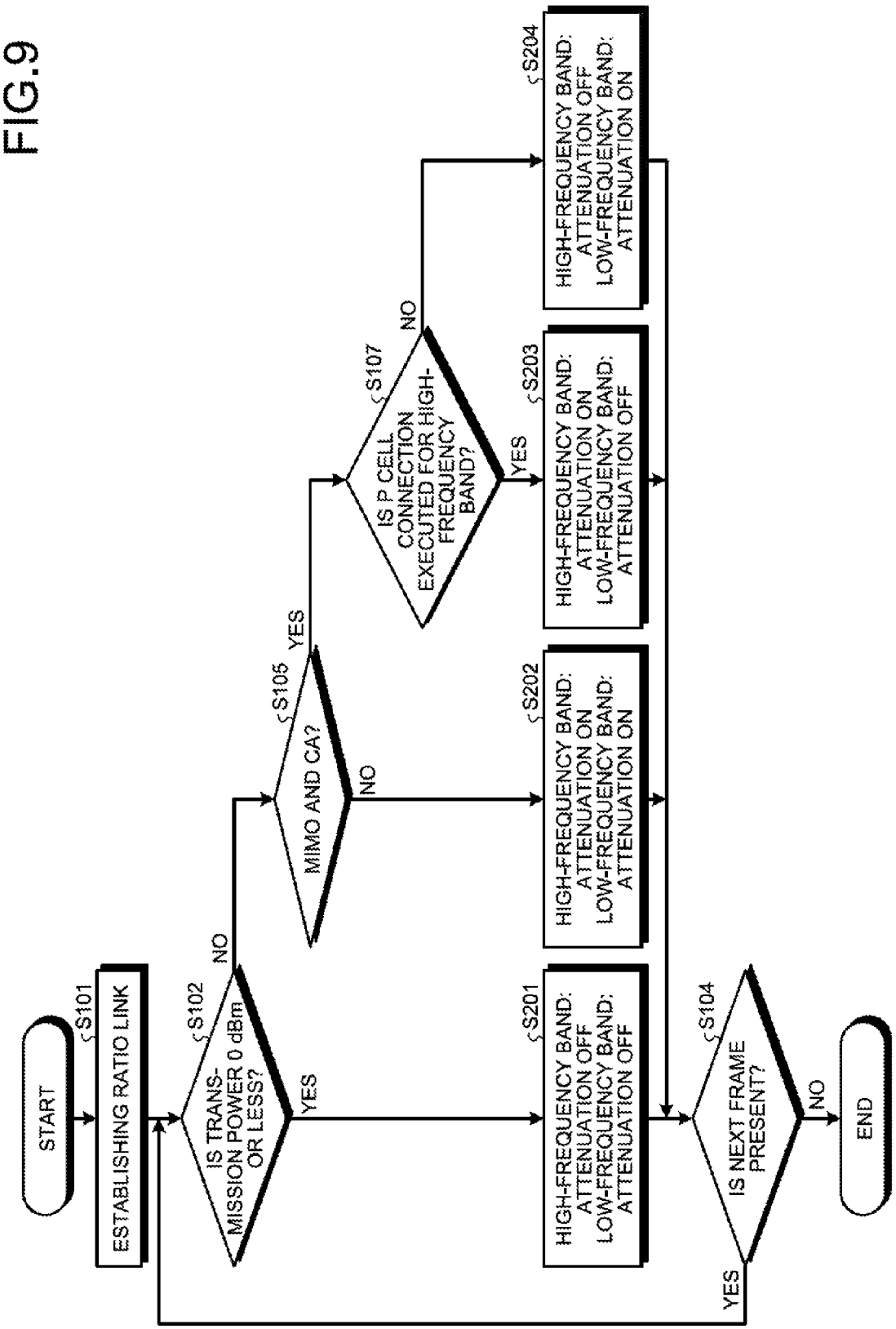

RADIO APPARATUS AND RECEIVING METHOD

CROSS-REFERENCE TO RELATED APPLICATION(S)

This application is based upon and claims the benefit of priority of the prior Japanese Patent Application No. 2016-014851, filed on Jan. 28, 2016, the entire contents of which are incorporated herein by reference.

FIELD

The embodiments discussed herein are related to a radio apparatus and a receiving method.

BACKGROUND

In recent years, a radio communication apparatus such as a smartphone may include a plurality of antennas for the purpose of improvement of a throughput thereof. That is, for example, Multi Input Multi Output (MIMO) communication is executed by utilizing a plurality of antennas, and thereby, a throughput of a radio communication apparatus can be improved. In particular, in a case where a large amount of downlink traffic from a base station apparatus toward a radio communication apparatus is provided, it is effective to introduce MIMO communication into downlink communication.

In a case where MIMO communication is introduced into downlink communication, a radio communication apparatus includes at least one main antenna and at least one sub-antenna. The main antenna is used at a time when an uplink signal from a radio communication apparatus toward a base station apparatus is transmitted, while the main antenna and the sub-antenna are used at a time when a downlink signal is received in the MIMO communication.

Thus, the main antenna is also used for transmission of a signal, and hence, a characteristic of the main antenna is generally emphasized at a time of design of the radio communication apparatus. That is, arrangement or the like of the main antenna and the sub-antenna is determined in such a manner that, for example, a Signal to Noise Ratio (SNR) of the main antenna satisfies a predetermined criterion. For this reason, a characteristic of the sub-antenna may be inferior to a characteristic of the main antenna.

Hence, in order to improve a characteristic of the sub-antenna and improve a throughput thereof, a Low Noise Amplifier (LNA) may be arranged in a receiving circuit that is connected to the sub-antenna. An LNA is an amplifier with a small Noise Figure (NF) and can amplify a signal received by the sub-antenna without adding a high level of noise thereto. Such an LNA is arranged in the receiving circuit that is connected to the sub-antenna, and thereby, for example, degradation of a characteristic of the sub-antenna due to antenna arrangement can be compensated for.

Patent document 1: Japanese National Publication of International Patent Application No. 10-510965
Patent document 2: Japanese Laid-open Patent Publication No. 2014-187428

Meanwhile, carrier aggregation that assigns a plurality of carriers with different frequencies to one radio communication apparatus to execute communication has recently been put into practical use for the purpose of further improvement of a throughput thereof. That is, for example, a carrier in the 800 MHz band and a carrier in the 2 GHz band are assigned to one radio communication apparatus and the radio communication apparatus may transmit and receive signals of both carriers.

Specifically, the radio communication apparatus uses a carrier in a frequency band that is one of the 800 MHz band and the 2 GHz band to execute Primary Cell connection (that will be referred to as "P cell connection" below) to a base station apparatus and uses a carrier in the other frequency band to execute Secondary Cell connection to the base station apparatus. In a case where carrier aggregation is introduced into downlink communication, the radio communication apparatus transmits a signal of a carrier that is used for P cell connection from a main antenna while receiving signals of the carriers in both frequency bands from the main antenna and the sub-antenna.

Thus, signals that are received by the sub-antenna include signals with different frequencies, and hence, the received signals are band-limited by, for example, bandpass filters and subsequently input to the LNAs as described above. That is, signals in respective carrier bands are individually amplified by the LNAs in the receiving circuit that is connected to the sub-antenna.

However, at a time of carrier aggregation, there is a problem in that no throughput can be improved sufficiently even when the LNAs are arranged in the receiving circuit. Specifically, as described above, bandpass filters or the like are arranged in front of the LNAs, in order to obtain signals in respective carrier bands. For this reason, a cumulative NF in a circuit where the received signals are input to the LNAs is increased, and there is a certain limitation to improvement of a characteristic of the sub-antenna even when the received signals are amplified by the LNAs. As a result, reception quality of the sub-antenna does not satisfy a predetermined criterion and causes its retransmission or the like, so that no throughput may be improved sufficiently.

SUMMARY

According to an aspect of an embodiment, a radio apparatus includes a first antenna that transmits and receives a radio signal, a second antenna that receives a radio signal, a plurality of filters that acquire signals with mutually different frequencies from a received signal that is received by the second antenna, an amplification unit that is arranged in front of the plurality of filters and amplifies the received signal, and a control unit that controls whether or not the received signal is amplified by the amplification unit depending on a condition of radio communication by the first antenna and the second antenna.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an ON/OFF condition of a switch;

FIG. 9 is a flow diagram illustrating a receiving process according to the second embodiment.

DESCRIPTION OF EMBODIMENTS

Preferred embodiments of the present invention will be explained with reference to accompanying drawings. The present invention is not limited to these embodiments.

[a] First Embodiment

Figure 1:
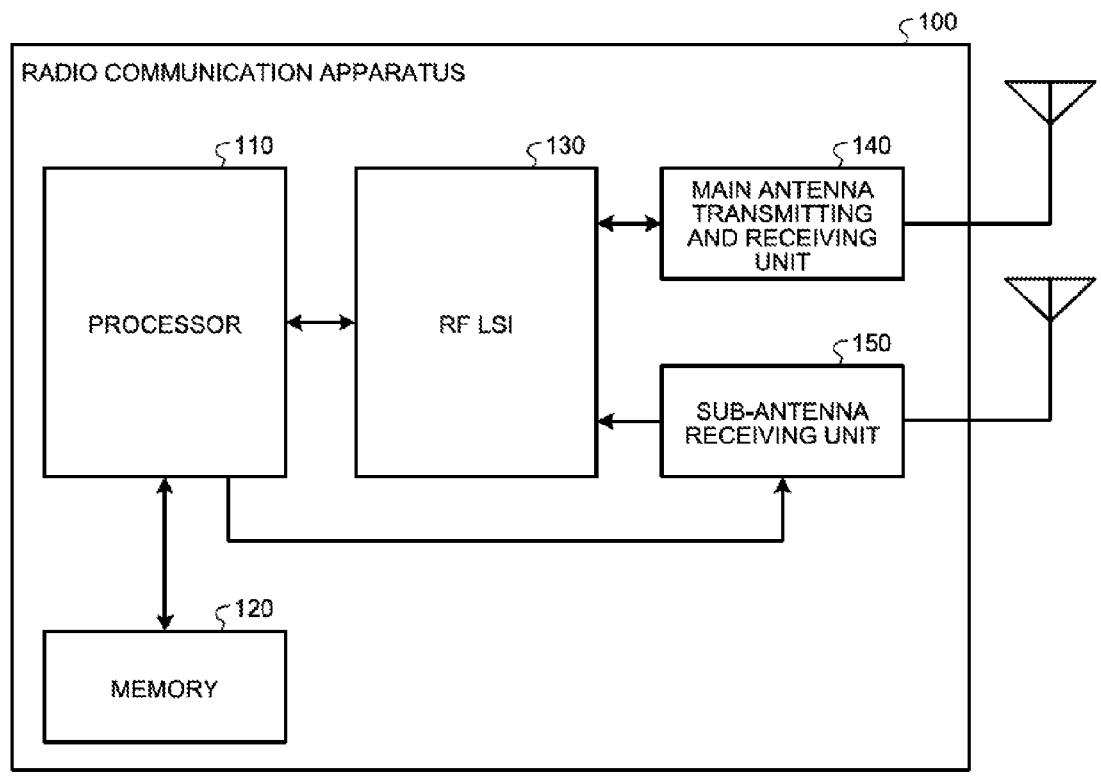
FIG. 1 is a block diagram illustrating a configuration of a radio communication apparatus according to a first embodiment.

FIG. 1 is a block diagram illustrating a configuration of a radio communication apparatus 100 according to a first embodiment. The radio communication apparatus 100 as illustrated in FIG. 1 includes a processor 110, a memory 120, a Radio Frequency (RF) Large Scale Integration (LSI) 130, a main antenna transmitting and receiving unit 140, and a sub-antenna receiving unit 150.

The processor 110 includes, for example, a Central Processing Unit (CPU), a Field Programmable Gate Array (FPGA), a Digital Signal Processor (DSP), or the like, and overall controls the entirety of the radio communication apparatus 100. That is, the processor 110 executes a variety of processes while the memory 120 is used. Specifically, the processor 110 executes baseband processing to generate a transmission signal from transmission data or acquire received data from a received signal. The processor 110 determines whether or not an LNA connected to a sub-antenna is bypassed based on transmission power from a main antenna or the like, and outputs a bypass control signal based on a result of determination to the sub-antenna receiving unit 150. A function of the processor 110 will be described in detail later.

The memory 120 includes, for example, a Random Access Memory (RAM), a Read Only Memory (ROM), a NAND-type flash memory, or the like, and stores a variety of information in a process that is executed by the processor 110.

The RF LSI 130 applies radio processing to a transmission signal and a received signal. Specifically, the RF LSI 130 applies quadrature modulation to a transmission signal with a baseband frequency that is input from the processor 110, and outputs an obtained transmission signal with a carrier frequency to the main antenna transmitting and receiving unit 140. That is, the RF LSI 130 applies quadrature modulation to a baseband signal, and thereby, converts it into a signal with a frequency of one carrier among a plurality of carriers that are used for carrier aggregation. The RF LSI 130 applies quadrature demodulation to a received signal with a carrier frequency that is input from the main antenna transmitting and receiving unit 140 or the sub-antenna receiving unit 150, and outputs an obtained received signal with a baseband frequency to the processor 110. That is, the RF LSI 130 applies quadrature demodulation to a signal with a frequency of one carrier, and thereby, converts it into a baseband signal.

A plurality of carriers that are used for carrier aggregation are divided into a carrier in a high-frequency band such as 2 GHz band and a carrier in a low-frequency band such as 800 MHz band. That is, each carrier is included in a radio frequency band that is one of a high-frequency band and a low-frequency band, and at least one carrier is included in a frequency band that is each of a high-frequency band and a low-frequency band. In carrier aggregation according to the present embodiment, a carrier in a frequency band that is one of a high-frequency band and a low-frequency band is used for primary cell connection (P cell connection) and used for transmission of a signal from the radio communication apparatus 100. The 2 GHz band and 800 MHz band as described above are examples of a high-frequency band and a low-frequency band, respectively, and for example, the 2 GHz band and the 1.8 GHz band may be a high-frequency band and a low-frequency band, respectively.

The main antenna transmitting and receiving unit 140 transmits, through a main antenna, a radio transmission signal that is output from the RF LSI 130. The main antenna transmitting and receiving unit 140 outputs, to the RF LSI 130, a signal that is received through the main antenna. A configuration of the main antenna transmitting and receiving unit 140 will be described in detail later.

The sub-antenna receiving unit 150 outputs, to the RF LSI 130, a signal that is received through a sub-antenna. Herein, the sub-antenna receiving unit 150 amplifies a received signal by an LNA arranged in front of a bandpass filter. The sub-antenna receiving unit 150 causes a received signal to bypass the LNA in accordance with a bypass control signal that is output from the processor 110 depending on a condition of radio communication. A configuration of the sub-antenna receiving unit 150 will be described in detail later.

Figure 2:
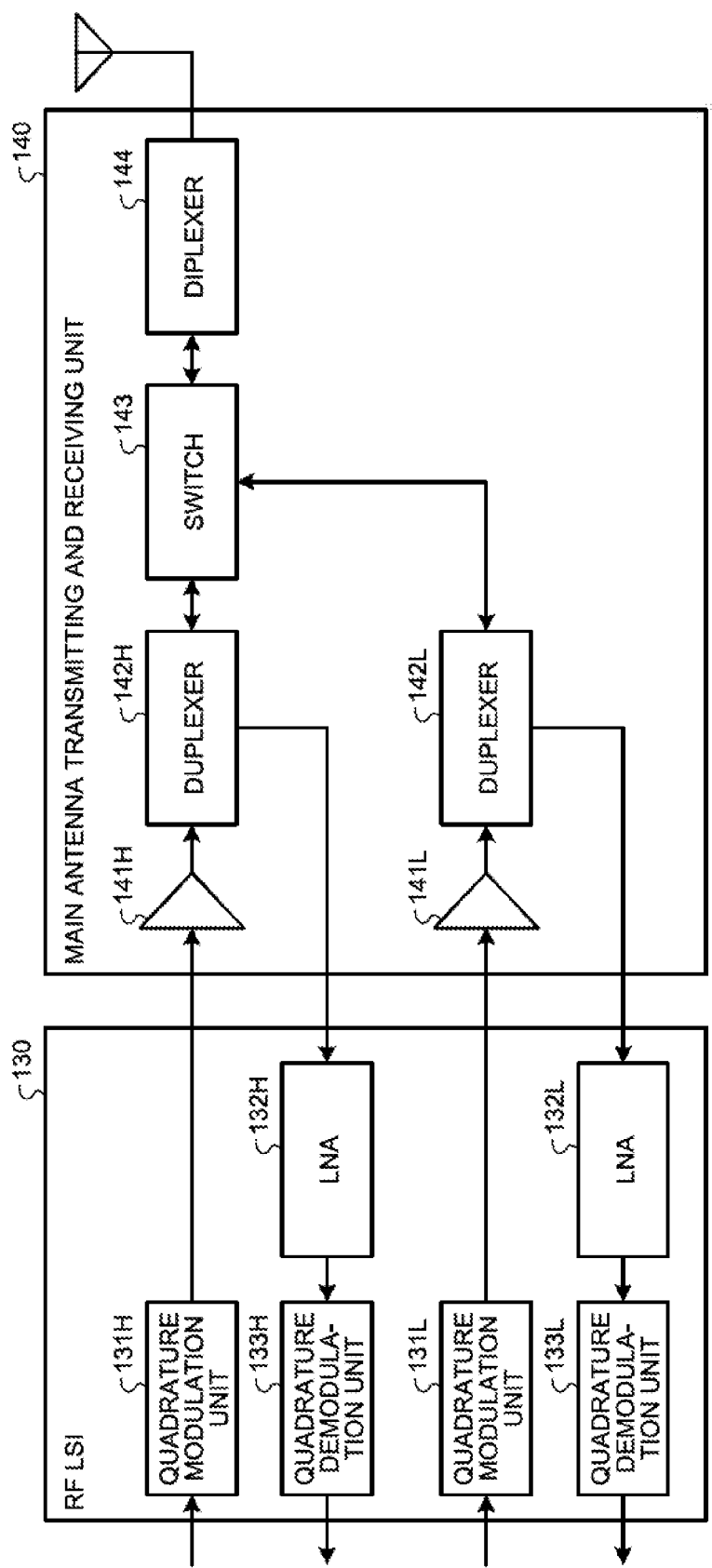
FIG. 2 is a block diagram illustrating a configuration of a maim antenna transmitting and receiving unit according to the first embodiment.

FIG. 2 is a block diagram illustrating a configuration of the main antenna transmitting and receiving unit 140. FIG. 2 also illustrates a configuration of the RF LSI 130 that is associated with the main antenna transmitting and receiving unit 140. The main antenna transmitting and receiving unit 140 as illustrated in FIG. 2 includes power amplifiers 141H and 141L, duplexers 142H and 142L, a switch 143, and a diplexer 144.

The power amplifier 141H amplifies a signal of a carrier in a high-frequency band. The power amplifier 141L amplifies a signal of a carrier in a low-frequency band.

The duplexer 142H switches between transmitting and receiving of a signal of a carrier in a high-frequency band. That is, the duplexer 142H transmits, from the main antenna through the switch 143 and the diplexer 144, a transmission signal that is output from the power amplifier 141H. On the other hand, the duplexer 142H outputs, to the RF LSI 130, a received signal that is output from the switch 143. The duplexer 142L switches between transmitting and receiving of a signal of a carrier in a low-frequency band. That is, the duplexer 142L transmits, from the main antenna through the switch 143 and the diplexer 144, a transmission signal that is output from the power amplifier 141L. On the other hand, the duplexer 142L outputs, to the RF LSI 130, a received signal that is output from the switch 143.

The switch 143 outputs, to the diplexer 144, transmission signals of carriers in a high-frequency band and a low-frequency band that are output from the duplexer 142H and the duplexer 142L. The switch 143 outputs a received signal of a carrier in a high-frequency band to the duplexer 142H while outputting a received signal of a carrier in a low-frequency band to the duplexer 142L. That is, the switch 143 switches an output destination of a received signal to the duplexer 142H or the duplexer 142L depending on whether a carrier frequency of the received signal is in a high-frequency band or a low-frequency band.

The diplexer 144 transmits, from the main antenna, a transmission signal that is output from the switch 143. That is, the diplexer 144 transmits, from the main antenna, a signal of a carrier that is used for P cell connection, among carriers in a high-frequency band and a low-frequency band. The diplexer 144 receives a signal from the main antenna and outputs it to the switch 143. Herein, the diplexer 144 separates signals of carriers in a high-frequency band and a low-frequency band from one another by, for example, a filter, and separately outputs the signal of a carrier in a high-frequency band and the signal of a carrier in a low-frequency band to the switch 143.

In association with the main antenna transmitting and receiving unit 140 as described above, the RF LSI 130 includes quadrature modulation units 131H and 131L, LNAs 132H and 132L, and quadrature demodulation units 133H and 133L.

The quadrature modulation units 131H and 131L apply quadrature modulation to a baseband signal that is input from the processor 110, so as to convert it into transmission signals of carriers in a high-frequency band and a low-frequency band, respectively. The quadrature modulation units 131H and 131L output the transmission signals to the power amplifiers 141H and 141L, respectively.

The LNAs 132H and 132L amplify, with low noise, received signals of carriers in a high-frequency band and a low-frequency band that are output from the duplexers 142H and 142L, respectively. The LNAs 132H and 132L output amplified received signals to the quadrature demodulation units 133H and 133L, respectively.

The quadrature demodulation units 133H and 133L apply quadrature demodulation to received signals of carriers in a high-frequency band and a low-frequency band, respectively, so as to convert them into received signals with a baseband frequency. The quadrature demodulation units 133H and 133L output obtained baseband signals to the processor 110.

Figure 3:
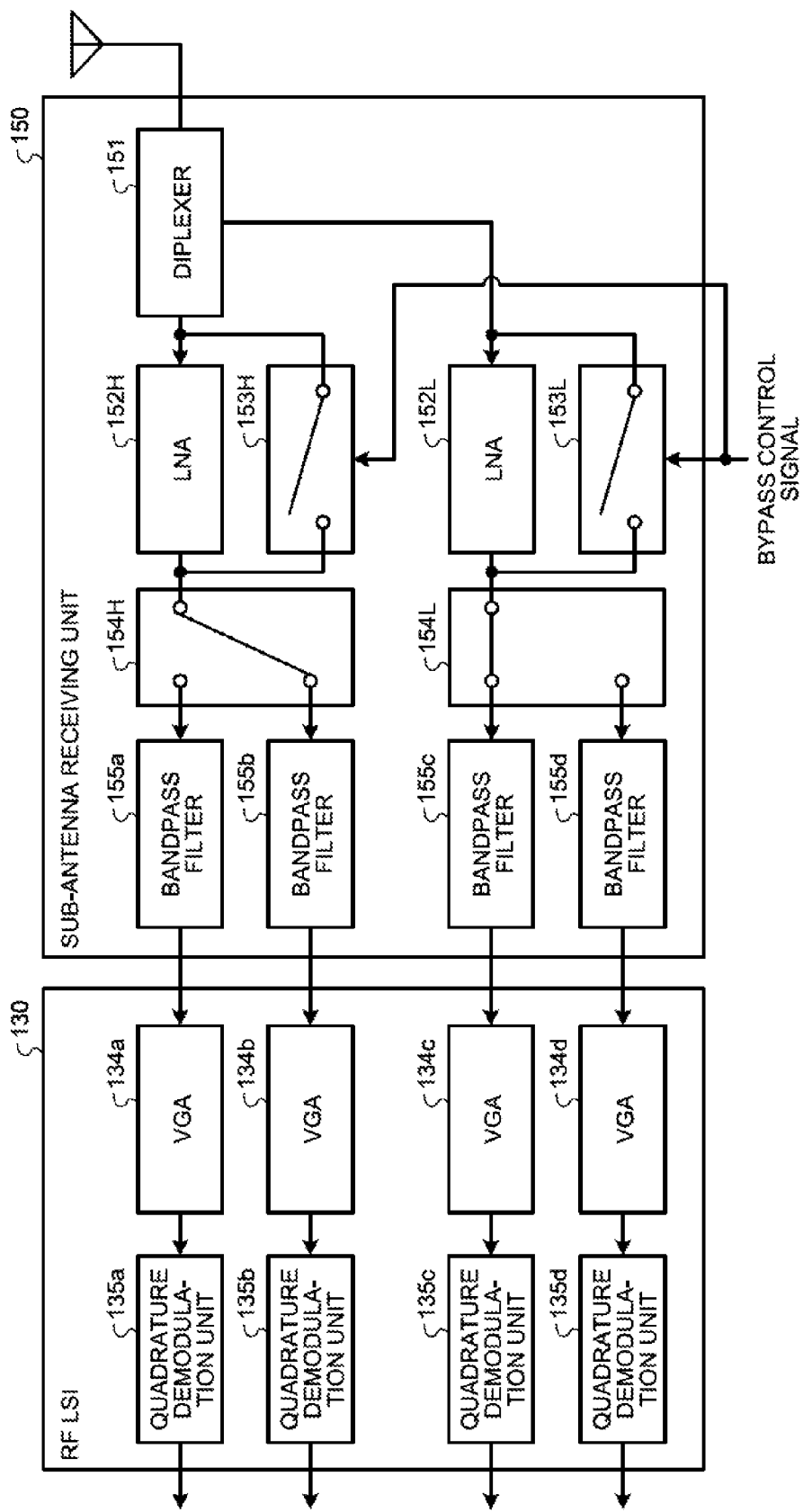
FIG. 3 is a block diagram illustrating a configuration of a sub-antenna receiving unit according to the first embodiment.

FIG. 3 is a block diagram illustrating a configuration of the sub-antenna receiving unit 150. FIG. 3 also illustrates a configuration of the RF LSI 130 that is associated with the sub-antenna receiving unit 150. The sub-antenna receiving unit 150 as illustrated in FIG. 3 includes a diplexer 151, LNAs 152H and 152L, bypass switches 153H and 153L, carrier switches 154H and 154L, and bandpass filters 155a to 155d.

The diplexer 151 receives a signal from the sub-antenna and separates signals of carriers in a high-frequency band and a low-frequency band from one another, by, for example, a filter. The diplexer 151 outputs a signal of a carrier in a high-frequency band to the LNA 152H and the bypass switch 153H and outputs a signal of a carrier in a low-frequency band to the LNA 152L and the bypass switch 153L.

A signal that is received from the sub-antenna by the diplexer 151 also includes a signal that is transmitted from the main antenna. That is, for example, in a case where P cell connection is executed by using a carrier in a high-frequency band, a signal of a carrier in a high-frequency band that is transmitted from the main antenna is received by the sub-antenna. For example, in a case where P cell connection is executed by using a carrier in a low-frequency band, a signal of a carrier in a low-frequency band that is transmitted from the main antenna is received by the sub-antenna. Therefore, received power of the sub-antenna with respect to a carrier in one frequency band that is used for a P cell connection by the radio communication apparatus 100 is greater than received power with respect to a carrier in the other frequency band.

The diplexer 151 separates signals of carriers in a high-frequency band and a low-frequency band from one another, and hence, a signal of a carrier in a high-frequency band with high received power is not output to any of the LNA 152L and the bypass switch 153L, for example, even in a case where the signal of a carrier in a high-frequency band is transmitted from the main antenna and received by the sub-antenna. Similarly, a signal of a carrier in a low-frequency band with high received power is not output to any of the LNA 152H and the bypass switch 153H, for example, even in a case where the signal of a carrier in a low-frequency band is transmitted from the main antenna and received by the sub-antenna.

The LNA 152H is arranged just behind the diplexer 151 and amplifies, with low noise, a signal of a carrier in a high-frequency band that is output from the diplexer 151. The LNA 152H is arranged in front of the bandpass filters 155a and 155b, and hence, amplifies a signal of a carrier in a high-frequency band at a stage with a small cumulative NF. That is, only the diplexer 151 is arranged in front of the LNA 152H, and hence, a cumulative NF at a circuit in front of the LNA 152H is small, so that a received signal in a state where a signal level relative to a noise level is high can be amplified. As a result, reception quality with respect to a signal of a carrier in a high-frequency band can be improved. In a case where signals of a plurality of carriers that belong to a high-frequency band are received, the LNA 152H may collectively amplify such signals of a plurality of carriers.

The LNA 152L is arranged just behind the diplexer 151 and amplifies, with low noise, a signal of a carrier in a low-frequency band that is output from the diplexer 151. The LNA 152L is arranged in front of the bandpass filters 155c and 155d, and hence, amplifies a signal of a carrier in a low-frequency band at a stage with a small cumulative NF. That is, only the diplexer 151 is arranged in front of the LNA 152L, and hence, a cumulative NF at a circuit in front of the LNA 152L is small, so that a received signal in a state where a signal level relative to a noise level is high can be amplified. As a result, reception quality with respect to a signal of a carrier in a low-frequency band can be improved. In a case where signals of a plurality of carriers that belong to a low-frequency band are received, the LNA 152L may collectively amplify such signals of a plurality of carriers.

Thus, the LNAs 152H and 152L are arranged just behind the diplexer 151 and collectively amplify signals of carriers in a high-frequency band and a low-frequency band, respectively, and hence, the number of LNAs can be reduced as compared with a case where an LNA is arranged for each carrier, so that reduction of a circuit size is possible.

The bypass switch 153H switches between an on-state and an off-state in accordance with a bypass control signal that is output from the processor 110, and in the on-state, a signal of a carrier in a high-frequency band that is output from the diplexer 151 is caused to bypass the LNA 152H. That is, in the off-state, the bypass switch 153H inputs a signal of a carrier in a high-frequency band to the LNA 152H, while, in the on-state, the signal of a carrier in a high-frequency band is not input to the LNA 152H but is output to the carrier switch 154H.

The bypass switch 153L switches between an on-state and an off-state in accordance with a bypass control signal that is output from the processor 110, and in the on-state, a signal of a carrier in a low-frequency band that is output from the diplexer 151 is caused to bypass the LNA 152L. That is, in the off-state, the bypass switch 153L inputs a signal of a carrier in a low-frequency band to the LNA 152L, while, in the on-state, the signal of a carrier in a low-frequency band is not input to the LNA 152L but is output to the carrier switch 154L.

The carrier switch 154H outputs a signal of a carrier in a high-frequency band that is output from the LNA 152H or the bypass switch 153H to the bandpass filter 155a or 155b that corresponds to a frequency of the carrier. That is, a frequency band that is a high-frequency band includes a plurality of carriers with mutually different frequencies, and hence, the carrier switch 154H outputs a signal of each carrier to the bandpass filter 155a or 155b that corresponds to a frequency of the carrier.

The carrier switch 154L outputs a signal of a carrier in a low-frequency band that is output from the LNA 152L or the bypass switch 153L to the bandpass filter 155c or 155d that corresponds to a frequency of the carrier. That is, a frequency band that is a low-frequency band includes a plurality of carriers with mutually different frequencies, and hence, the carrier switch 154L outputs a signal of each carrier to the bandpass filter 155c or 155d that corresponds to a frequency of the carrier.

The bandpass filters 155a to 155d are bandpass filters that transmit carriers with respective corresponding frequencies, and eliminate a noise component outside frequency bands that are included in signals of a carriers that are output from the carrier switches 154H and 154L.

In association with the sub-antenna receiving unit 150 as described above, the RF LSI 130 includes Variable Gain Amplifiers (VGAs) 134a to 134d and quadrature demodulation units 135a to 135d.

The VGAs 134a to 134d amplify, with variable gains, received signals of carriers that are band-limited by bandpass filters 155a to 155d, respectively. The VGAs 134a to 134d output amplified received signals of carriers to the quadrature demodulation units 135a to 135d, respectively.

The quadrature demodulation units 135a to 135d apply quadrature demodulation to respective received signals of carriers so as to convert them to received signals with a baseband frequency. The quadrature demodulation units 135a to 135d output obtained baseband signals to the processor 110.

Figure 4:
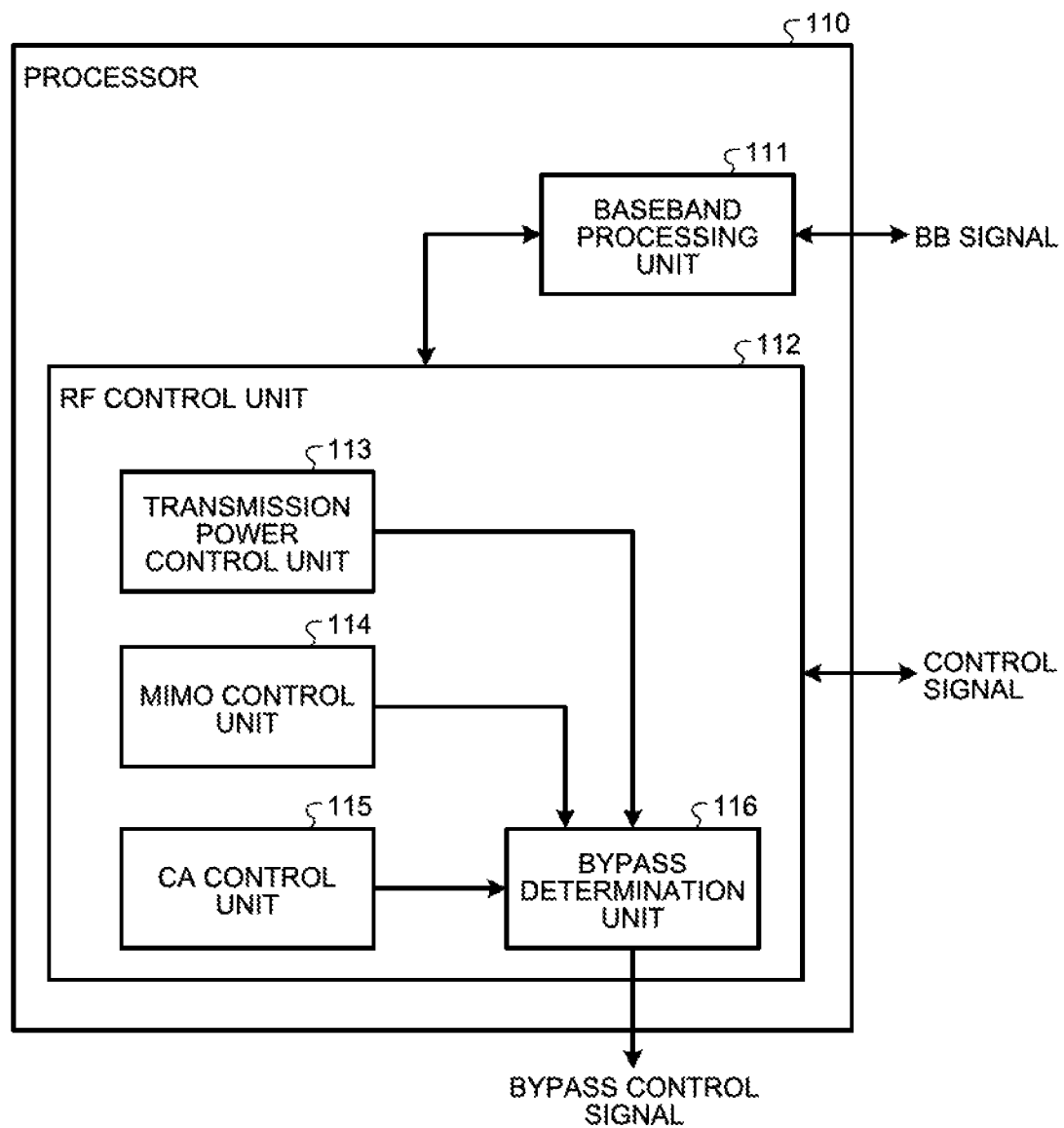
FIG. 4 is a block diagram illustrating a function of a processor according to the first embodiment.

Next, a function of the processor 110 according to the first embodiment will be described with reference to FIG. 4. FIG. 4 is a block diagram illustrating a function of the processor 110. The processor 110 as illustrated in FIG. 4 includes a baseband processing unit 111 and an RF control unit 112.

The baseband processing unit 111 executes baseband processing of a signal. Specifically, the baseband processing unit 111 executes encoding of transmission data or the like to generate a transmission signal with a baseband frequency, and outputs it to the RF LSI 130. The baseband processing unit 111 acquires a received signal with a baseband frequency from the RF LSI 130 and executes decoding of the received signal or the like to obtain received data. In FIG. 4, a baseband signal that is input to or output from the baseline processing unit 111 is abbreviated to a "BB signal".

The baseband processing unit 111 informs the RF control unit 112 of information with respect to a condition of radio communication, among received data obtained by baseband processing. Specifically, the baseband processing unit 111 informs the RF control unit 112 of information as to whether or not MIMO communication is executed or whether or not communication on carrier aggregation is executed. In a case where communication on carrier aggregation is executed, the baseband processing unit 111 informs the RF control unit 112 of information that indicates a frequency band of a carrier that is used for P cell connection. Such information as to a condition of radio communication is included in a signal that is informed of from a base station apparatus that is a communication partner of the radio communication apparatus 100.

The RF control unit 112 outputs control signals to the RF LSI 130, the main antenna transmitting and receiving unit 140, and the sub-antenna receiving unit 150, and thereby, controls radio processing in such processing units. That is, the RF control unit 112 controls the power amplifiers 141H and 141L of the main antenna transmitting and receiving unit 140 to execute transmission power control, or controls the switch 143 to switch output destinations of received signals of carriers in a high-frequency band and a low-frequency band. The RF control unit 112 generates a bypass control signal based on a condition of radio communication that is informed of from the baseband processing unit 111 and switches between presence and absence of use of the LNA 152H or 152L of the sub-antenna receiving unit 150. Specifically, the RF control unit 112 includes a transmission power control unit 113, an MIMO control unit 114, a carrier aggregation control unit (that will be abbreviated to a "CA control unit" below) 115 and a bypass determination unit 116.

The transmission power control unit 113 determines transmission power of a signal that is transmitted from the main antenna and controls a gain of the power amplifier 141H or 141L of the main antenna transmitting and receiving unit 140 in accordance with determined transmission power. Herein, in a case where a carrier that is used for P cell connection is a carrier in a high-frequency band, the transmission power control unit 113 controls a gain of the power amplifier 141H that amplifies a signal of the carrier in a high-frequency band. In a case where a carrier that is used for P cell connection is a carrier in a low-frequency band, the transmission power control unit 113 controls a gain of the power simplifier 141L that amplifies a signal of the carrier in a low-frequency band. The transmission power control unit 113 informs the bypass determination unit 116 of determined transmission power.

The MIMO control unit 114 switches between presence and absence of receiving of a signal on MIMO in accordance with information as to whether or not MIMO communication is executed. That is, in a case where MIMO communication is executed, the MIMO control unit 114 executes setting for MIMO receiving where signals are received by both the main antenna and the sub-antenna to separate respective signals transmitted from a plurality of transmission antennas from one another. On the other hand, in a case where MIMO communication is not executed, the MIMO control unit 114 executes setting for stopping receiving of a signal by the sub-antenna or executing diversity receiving by the main antenna and the sub-antenna. The MIMO control unit 114 informs the bypass determination unit 116 of whether or not MIMO communication is executed.

The CA control unit 115 switches between presence and absence of receiving of a signal on carrier aggregation in accordance with information as to whether or not communication on carrier aggregation is executed. That is, in a case where carrier aggregation is executed, the CA control unit 115 operates each of processing units that correspond to a plurality of carriers in the RF LSI 130, the main antenna transmitting and receiving unit 140, and the sub-antenna receiving unit 150. On the other hand, in a case where carrier aggregation is not executed, the CA control unit 115 operates each of processing units that correspond to one frequency band in the RF LSI 130, the main antenna transmitting and receiving unit 140, and the sub-antenna receiving unit 150 and stops each of processing units that correspond to the other frequency band.

Therefore, for example, in a case where only a carrier in a high-frequency band is used without executing carrier aggregation, the CA control unit 115 operates the power amplifier 141H and the duplexer 142H of the main antenna transmitting and receiving unit 140, and stops the power amplifier 141L and the duplexer 142L. Similarly, the CA control unit 115 operates the LNA 152H, the bypass switch 153H, the carrier switch 154H, and the bandpass filters 155a and 155b of the sub-antenna receiving unit 150 and stops the LNA 152L, the bypass switch 153L, the carrier switch 154L, and the bandpass filters 155c and 155d. The CA control unit 115 informs the bypass determination unit 116 of whether or not carrier aggregation is executed.

The bypass determination unit 116 determines whether or not a received signal from the sub-antenna is caused to bypass the LNA 152H or 152L, based on conditions of radio communication that are informed of from the transmission power control unit 113, the MIMO control unit 114, and the CA control unit 115. The bypass determination unit 116 outputs a bypass control signal that is based on a determination result to the bypass switches 153H and 153L of the sub-antenna receiving unit 150.

Specifically, the bypass determination unit 116 determines an on-state or an off-state of the bypass switch 153H or 153L in accordance with conditions of radio communication, for example, as illustrated in FIG. 5. That is, in a case where transmission power informed of from the transmission power control unit 113 is less than or equal to a predetermined threshold (for example, 0 dBm), the bypass determination unit 116 determines that the bypass switches 153H and 153L are in off-states. In a case where transmission power from the main antenna is small, power of a signal that is transmitted from the main antenna and received by the sub-antenna is small, and power saturation is not caused even when a signal received from the sub-antenna is input to the LNA 152H or 152L. For this reason, in a case where transmission power is small, the bypass determination unit 116 determines that a received signal is prevented from bypassing the LNA 152H or 152L, and generates a bypass control signal that causes the bypass switches 153H and 153L to be in off-states.

On the other hand, in a case where transmission power informed of from the transmission power control unit 113 is greater than a predetermined threshold (for example, 0 dBm), the bypass determination unit 116 determines whether or not MIMO communication is executed and carrier aggregation is executed. In a case where at least one of MIMO communication and carrier aggregation is not executed, the bypass determination unit 116 determines that the bypass switches 153H and 153L are caused to be in on-states. In a case where transmission power from the main antenna is large, power of a signal that is transmitted from the main antenna and received by the sub-antenna is large, and power saturation may be caused when a signal received from the sub-antenna is input to the LNA 152H or 152L. Transmission power that is large indicates that transmission power is large as a result of deteriorated radio wave environment, and in a case where radio wave environment is deteriorated, none of MIMO communication and carrier aggregation is executed generally. For this reason, in a case where transmission power is large and at least one of MIMO communication and carrier aggregation is not executed, the bypass determination unit 116 determines that a received signal is caused to bypass the LNAs 152H and 152L, and generates a bypass control signal that causes the bypass switches 153H and 153L to be in on-states.

Meanwhile, in a case where transmission power from the main antenna is large and carrier aggregation is executed, a signal in a frequency band other than a frequency band that is used for P cell connection is not transmitted from the main antenna. For this reason, for a frequency band other than a frequency band that is used for P cell connection, power of a signal that is transmitted from the main antenna and received by the sub-antenna is not large. Hence, even in a case where transmission power is greater than a predetermined threshold (for example, 0 dBm), the bypass determination unit 116 determines that the LNA 152H or 152L that corresponds to a frequency band other than a frequency band that is used for P cell connection is not bypassed as long as MIMO communication and carrier aggregation are executed.

In other words, in a case where a carrier in a high-frequency band is used for P cell connection, the bypass determination unit 116 generates a bypass control signal that causes only the bypass switch 153H that corresponds to the carrier in a high-frequency band to be in an on-state and causes the bypass switch 153L that corresponds to a carrier in a low-frequency band to be in an off-state. In a case where a carrier in a low-frequency band is used for P cell connection, the bypass determination unit 116 generates a bypass control signal that causes only the bypass switch 153L that corresponds to the carrier in a low-frequency band to be in an on-state and causes the bypass switch 153H that corresponds to a carrier in a high-frequency band to be in an off-state.

Figure 6:
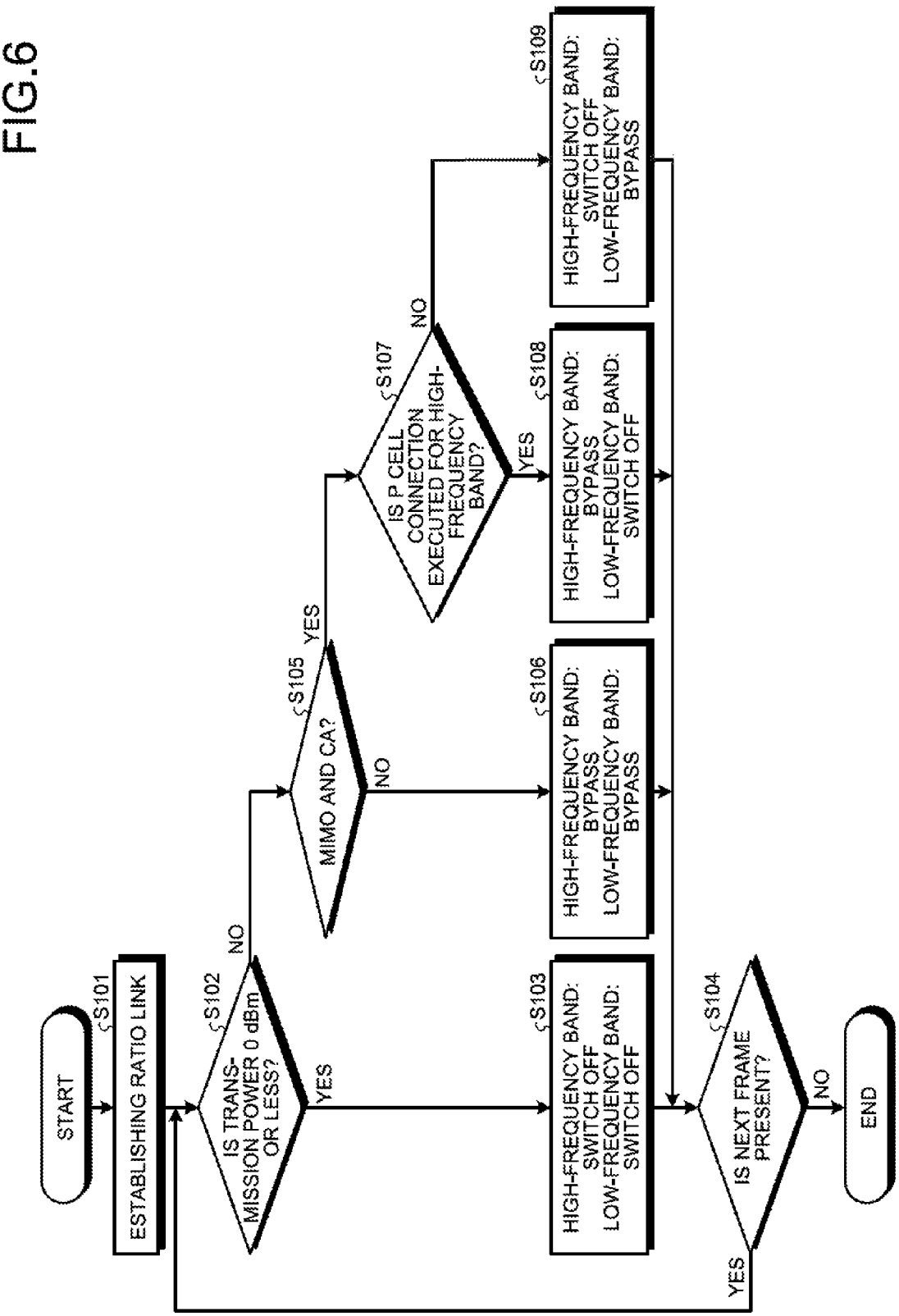
FIG. 6 is a flow diagram illustrating a receiving process according to the first embodiment.

Next, a receiving process that is executed by the radio communication apparatus 100 configured as described above will be described with reference to a flow diagram as illustrated in FIG. 6.

The radio communication apparatus 100 establishes a radio link with, for example, a base station apparatus that is a communication partner (step S101). At a time of establishment of a radio link, whether or not MIMO communication and carrier aggregation are executed or the like is instructed from a base station apparatus for radio communication. As such an instruction is received, the MIMO control unit 114 and the CA control unit 115 execute setting for MIMO communication and carrier aggregation. The MIMO control unit 114 and the CA control unit 115 inform the bypass determination unit 116 of whether or not MIMO communication and carrier aggregation are executed. In a case where carrier aggregation is executed, the bypass determination unit 116 is informed of a frequency band of a carrier that is used for P cell connection.

The transmission power control unit 113 controls transmission power of a transmission signal from the main antenna and the bypass determination unit 116 is informed of the transmission power. A transmission signal that is generated by the baseband processing unit 111 is transmitted by transmission power that is controlled by the transmission power control unit 113. Thus, as a condition of radio communication of an established radio link is determined, the bypass determination unit 116 executes determination as to whether or not a received signal from the sub-antenna is caused to bypass the LNA 152H or 152L.

Specifically, the bypass determination unit 116 determines whether or not transmission power is less than or equal to a predetermined threshold (for example, 0 dBm) (step S102). As a result of such determination, in a case where transmission power is less than or equal to the predetermined threshold (step S102, Yes), power of a signal that is transmitted from the main antenna and received by the sub-antenna is small, so that power saturation of an amplifier is not caused even when a received signal from the sub-antenna is input to the amplifier.

For this reason, the bypass determination unit 116 determines that a received signal is prevented from bypassing the LNA 152H or 152L, and determines that the bypass switches 153H and 153L are caused to be in off-states (step S103). The bypass determination unit 116 generates a bypass control signal that causes the bypass switches 153H and 153L to be in off-states, so that the bypass switches 153H and 153L are caused to be off-states. Thereby, a signal received by the sub-antenna is input to the LNA 152H or the LNA 152L through the diplexer 151 and amplified with low noise. As a result, reception quality of the sub-antenna is improved, so that a throughput can be improved.

On the other hand, in a case where transmission power is greater than a predetermined threshold (for example, 0 dBm) (step S102, No), the bypass determination unit 116 determines whether or not MIMO communication and carrier aggregation are executed (step S105). As a result of such determination, in a case where at least one of MIMO communication and carrier aggregation is not executed (step S105, No), power of a signal that is transmitted from the main antenna and received by the sub-antenna is large, and power saturation of an amplifier may be caused when a received signal from the sub-antenna is input to the amplifier.

For this reason, the bypass determination unit 116 determines that a received signal is caused to bypass the LNAs 152H and 152L, and determines that the bypass switches 153H and 153L are caused to be in on-states (step S106). The bypass determination unit 116 generates a bypass control signal that causes the bypass switches 153H and 153L to be in on-states, so that the bypass switches 153H and 153L are caused to be in on-states. Thereby, a signal received from the sub-antenna goes through the diplexer 151, and subsequently, is not input to the LNA 152H or 152L but is output to the carrier switch 154H or 154L. As a result, power saturation on the LNA 152H or 152L can be prevented, and deterioration of reception quality that is caused by power saturation can be suppressed.

In a case where both MIMO communication and carrier aggregation are executed (step S105, Yes), whether or not a carrier that is used for P cell connection is a carrier that belongs to a high-frequency band is determined (step S107). As a result of such determination, in a case where P cell connection is executed by using a carrier that belongs to a high-frequency band (step S107, Yes), a frequency band of a signal that is transmitted with large transmission power from the main antenna is a high-frequency band, and hence, power of a signal in a high-frequency band that is received by the sub-antenna is large.

Thereby, the bypass determination unit 116 determines that the LNA 152H that corresponds to a high-frequency band is bypassed, and determines that the bypass switch 153H is caused to be in an on-state and the bypass switch 153L is caused to be in an off-state (step S108). The bypass determination unit 116 generates a bypass control signal that causes the bypass switch 153H to be in an on-state and causes the bypass switch 153L to be in an off-state, so that the bypass switch 153H and 153L are controlled. Thereby, a signal of a carrier in a high-frequency band among signals received from the sub-antenna is not input to the LNA 152H but is output to the carrier switch 154H, and a signal of a carrier in a low-frequency band is input to the LNA 152L and amplified with low noise. As a result, reception quality of a signal of a carrier in a low-frequency band is improved so that a throughput can be improved, and deterioration of reception quality of a signal of a carrier in a high-frequency band that is caused by power saturation can be suppressed.

On the other hand, in a case where P cell connection is executed by using a carrier that belongs to a low-frequency band (step S107, No), a frequency band of a signal that is transmitted with large transmission power from the main antenna is a low-frequency band, and hence, power of a signal in a low-frequency band that is received by the sub-antenna is large.

Thereby, the bypass determination unit 116 determines that the LNA 152L that corresponds to a low-frequency band is bypassed, and determines that the bypass switch 153L is caused to be in an on-state and the bypass switch 153H is caused to be in an on-state (step S109). The bypass determination unit 116 generates a bypass control signal that causes the bypass switch 153L to be in an on-state and causes the bypass switch 153H to be in an off-state, so that the bypass switches 153H and 153L are controlled. Thereby, a signal of a carrier in a low-frequency band, among signals received from the sub-antenna, is not input to the LNA 152L but is output to the carrier switch 154L, and a signal of a carrier in a high-frequency band is input to the LNA 152H and amplified with low noise. As a result, reception quality of a signal of a carrier in a high-frequency band is improved so that a throughput can be improved, and deterioration of reception quality of a carrier in a low-frequency band that is caused by power saturation can be suppressed.

Such determination of an on-state or an off-state of the bypass switch 153H or 153L is executed in units of frames of a received signal, and when determination for one frame is completed, whether or not a next frame is present in the received signal is determined (step S104). As a result of such determination, in a case where a next frame is present (step S104, Yes), determination of an on-state or an off-state of the bypass switch 153H or 153L based on a condition of radio communication is repeated. In a case where a next frame is absent in the received signal (step S104, No), the process is ended.

As described above, according to the present embodiment, an LNA for each frequency band is arranged in front of a bandpass filter for each carrier in a receiving circuit of a sub-antenna and a bypass switch is provided that bypasses the LNA. In a case where transmission power from a main antenna is large, an LNA for a frequency band where a carrier that is used for transmission belongs thereto is bypassed, and only an LNA for a frequency band where transmission power from the main antenna is small amplifies a received signal. For this reason, at a stage with a small cumulative NF in a receiving circuit of a sub-antenna, a received signal can be amplified without causing power saturation in an LNA, and a throughput can be improved at a time of carrier aggregation.

[b] Second Embodiment

A feature of a second embodiment is that a gain of a variable gain LNA is controlled instead of switching between presence and absence of a bypass of the LNA.

A configuration of a radio communication apparatus according to the second embodiment is similar to that of the first embodiment (FIG. 1), and hence, a description thereof will be omitted. Functions of a sub-antenna receiving unit 150 and a processor 110 in the second embodiment are different from those of the first embodiment.

Figure 7:
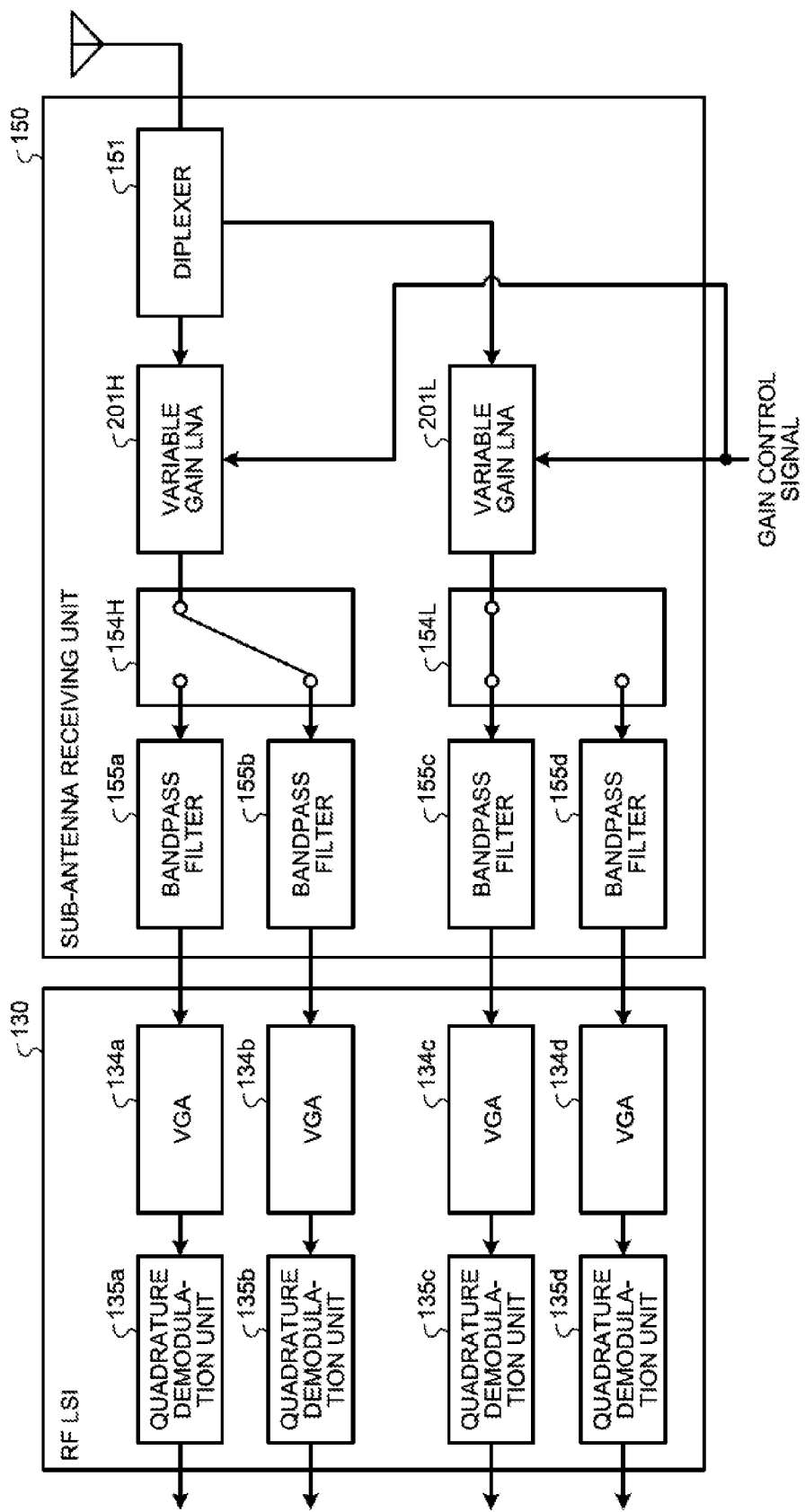
FIG. 7 is a block diagram illustrating a configuration of a sub-antenna receiving unit according to a second embodiment.

FIG. 7 is a block diagram illustrating a configuration of the sub-antenna receiving unit 150 according to the second embodiment. In FIG. 7, a part identical to that of FIG. 3 is provided with an identical sign and a description thereof will be omitted. The sub-antenna receiving unit 150 as illustrated in FIG. 7 includes variable gain LNAs 201H and 201L instead of the LNAs 152H and 152L and the bypass switches 153H and 153L of the sub-antenna receiving unit 150 as illustrated in FIG. 3.

The variable gain LNA 201H is arranged just behind the diplexer 151 and amplifies a signal of a carrier in a high-frequency band that is output from the diplexer 151, with a gain in accordance with a gain control signal that is output from the processor 110. The variable gain LNA 201H is arranged in front of the bandpass filters 155a and 155b, and hence, amplifies a signal of a carrier in a high-frequency band at a stage with a small cumulative NF. That is, only the diplexer 151 is arranged in front of the variable gain LNA 201H, and hence, a cumulative NF in a circuit in front of the variable gain LNA 201H is small, so that a received signal in a state where a signal level relative to a noise level is high can be amplified. As a result, reception quality of a signal of a carrier in a high-frequency band can be improved. In a case where signals of a plurality of carriers that belong to a high-frequency band are received, the variable gain LNA 201H may collectively amplify such signals of a plurality of carriers.

The variable gain LNA 201L is arranged just behind the diplexer 151 and amplifies a signal of a carrier in a low-frequency band that is output from the diplexer 151, with a gain in accordance with a gain control signal that is output from the processor 110. The variable gain LNA 201L is arranged in front of the bandpass filters 155c and 155d, and hence, amplifies a signal of a carrier in a low-frequency band at a stage with a small cumulative NF. That is, only the diplexer 151 is arranged in front of the variable gain LNA 201L, and hence, a cumulative NF in a circuit in front of the variable gain LNA 201L is small, so that a received signal in a state where a signal level relative to a noise level is high can be amplified. As a result, reception quality of a signal of a carrier in a low-frequency band can be improved. In a case where signals of a plurality of carriers that belong to a low-frequency band are received, the variable gain LNA 201L may collectively amplify such signals of a plurality of carriers.

Figure 8:
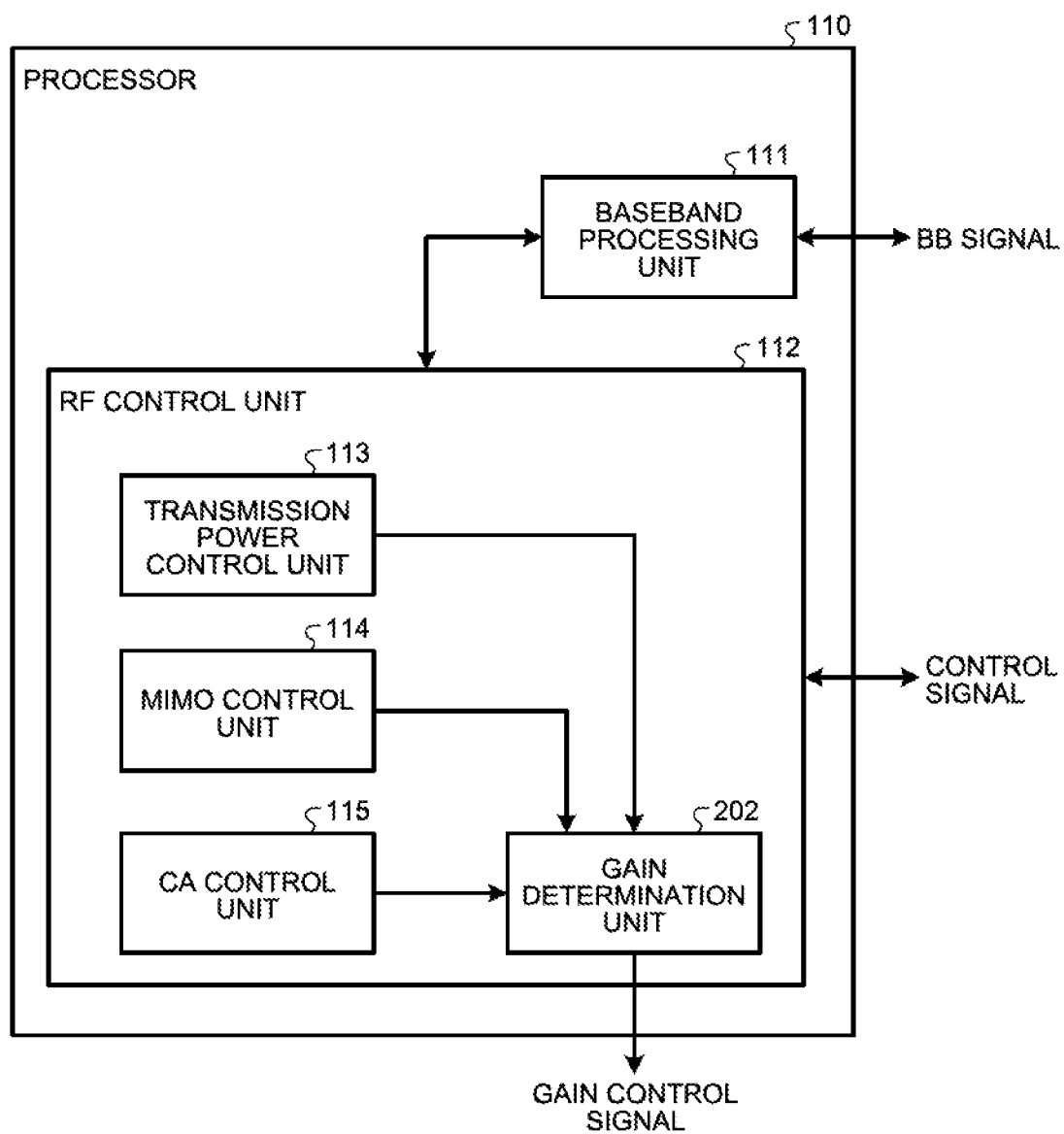
FIG. 8 is a block diagram illustrating a function of a processor according to the second embodiment.

Next, a function of the processor 110 according to the second embodiment will be described with reference to FIG. 8. FIG. 8 is a block diagram illustrating a function of the processor 110 according to the second embodiment. In FIG. 8, a part identical to that of FIG. 4 is provided with an identical sign and a description thereof will be omitted. The processor 110 as illustrated in FIG. 8 includes a gain determination unit 202 instead of the bypass determination unit 116 of the processor 110 as illustrated in FIG. 4.

The gain determination unit 202 determines a gain of the variable gain LNA 201H or 201L based on conditions of radio communication that are informed of from the transmission power control unit 113, the MIMO control unit 114, and the CA control unit 115. The gain determination unit 202 outputs a gain control signal that indicates a determined gain to the variable gain LNA 201H or 201L of the sub-antenna receiving unit 150.

Specifically, in a case where transmission power informed of from the transmission power control unit 113 is less than or equal to a predetermined threshold (for example, 0 dBm), the gain determination unit 202 determines gains of the variable gain LNAs 201H and 201L as comparatively large gains suitable for amplification. In a case where transmission power from the main antenna is small, power of a signal that is transmitted from the main antenna and received by the sub-antenna is small, so that power saturation is not caused even when gains of the variable gain LNAs 201H and 201L are comparatively large. For this reason, in a case where transmission power is small, the gain determination unit 202 generates a gain control signal that instructs to set gains suitable for amplification of a received signal.

On the other hand, in a case where transmission power informed of from the transmission power control unit 113 is greater than a predetermined threshold (for example, 0 dBm), the gain determination unit 202 determines whether or not MIMO communication is executed and carrier aggregation is executed. In a case where at least one of MIMO communication and carrier aggregation is not executed, the gain determination unit 202 determines gains of the variable gain LNAs 201H and 201L as small gains that are less than or equal to a predetermined value. In a case where transmission power from the main antenna is large, power of a signal that is transmitted from the main antenna and received by the sub-antenna is large, so that power saturation may be caused as gains of the variable gain LNAs 201H and 201L are large. Transmission power that is large indicates that transmission power is large as a result of deteriorated radio wave environment, and in a case where radio wave environment is deteriorated, none of MIMO communication and carrier aggregation is executed generally. For this reason, in a case where transmission power is large and at least one of MIMO communication and carrier aggregation is not executed, the gain determination unit 202 generates a gain control signal that instructs to set small gains that are less than or equal to a predetermined value.

Meanwhile, even when transmission power from the main antenna is large, a signal in a frequency band other than a frequency band that is used for P cell connection is not transmitted from the main antenna in a case where carrier aggregation is executed. For this reason, for a frequency band other than a frequency band that is used for P cell connection, power of a signal that is transmitted from the main antenna and received by the sub-antenna is not large. Hence, even in a case where transmission power is greater than a predetermined threshold (for example, 0 dBm), the gain determination unit 202 determines a gain of the variable gain LNA 201H or 201L that corresponds to a frequency band other than a frequency band that is used for P cell connection, as a comparatively large gain, as long as MIMO communication and carrier aggregation are executed.

In other words, in a case where a carrier in a high-frequency band is used for P cell connection, the gain determination unit 202 generates a gain control signal that causes a gain of the variable gain LNA 201H that corresponds to a carrier in a high-frequency band to be small and causes a gain of the variable gain LNA 201L that corresponds to a carrier in a low-frequency band to be large. In a case where a carrier in a low-frequency band is used for P cell connection, the gain determination unit 202 generates a gain control signal that causes a gain of the variable gain LNA 201L that corresponds to a carrier in a low-frequency band to be small and causes a gain of the variable gain LNA 201H that corresponds to a carrier in a high-frequency band to be large.

Next, a receiving process that is executed by the radio communication apparatus configured as described above will be described with reference to a flow diagram as illustrated in FIG. 9. In FIG. 9, a part identical to that of FIG. 6 is provided with an identical sign and a detailed description thereof will be omitted.

As the radio communication apparatus 100 establishes a radio link with, for example, a base station apparatus that is a communication partner (step S101), the gain determination unit 202 is informed of conditions of radio communication such as transmission power, presence or absence of MIMO communication, and presence or absence of carrier aggregation. As conditions of radio communication on an established radio link are determined, the gain determination unit 202 determines gains of the variable gain LNAs 201H and 201L.

Specifically, the gain determination unit 202 determines whether or not transmission power is less than or equal to a predetermined threshold (for example, 0 dBm) (step S102). As a result of such determination, in a case where transmission power is less than or equal to the predetermined threshold (step S102, Yes), power of a signal that is transmitted from the main antenna and received by the sub-antenna is small, so that power saturation of an amplifier is not caused even when a received signal from the sub-antenna is input to the amplifier.

For this reason, the gain determination unit 202 determines that attenuation on the variable gain LNA 201H or 201L is not needed and determines that gains of the variable gain LNAs 201H and 201L are caused to be comparatively large gains (step S201). The gain determination unit 202 generates a gain control signal that causes gains of the variable gain LNAs 201H and 201L to be comparatively large gains suitable for amplification, so that gains of the variable gain LNAs 201H and 201L are set. Thereby, a signal received from the sub-antenna is input to the variable gain LNA 201H or the variable gain LNA 201L through the diplexer 151 and amplified with low noise. As a result, reception quality of the sub-antenna is improved so that a throughput can be improved.

On the other hand, in a case where transmission power is greater than a predetermined threshold (for example, 0 dBm) (step S102, No), the gain determination unit 202 determines whether or not MIMO communication and carrier aggregation are executed (step S105). As a result of such determination, in a case where at least one of MIMO communication and carrier aggregation is not executed (step S105, No), power of a signal that is transmitted from the main antenna and received by the sub-antenna is large, so that power saturation of an amplifier may be caused as a received signal from the sub-antenna is input to the amplifier.

For this reason, the gain determination unit 202 determines that attenuation on the variable gain LNAs 201H and 201L is needed, and determines that gains of the variable gain LNAs 201H and 201L are caused to be gains that are less than or equal to the predetermined value (step S202). The gain determination unit 202 generates a gain control signal that causes gains of the variable gain LNAs 201H and 201L to be small gains that are less than or equal to the predetermined value, so that gains of the variable gain LNAs 201H and 201L are set. Thereby, a signal received from the sub-antenna is input to the variable gain LNA 201H or 201L through the diplexer 151 and attenuated. As a result, power saturation on the variable gain LNA 201H or 201L can be prevented, so that deterioration of reception quality that is caused by power saturation can be suppressed.

In a case where both MIMO communication and carrier aggregation are executed (step S105, Yes), whether or not a carrier that is used for P cell connection is a carrier that belongs to a high-frequency band is determined (step S107). As a result of such determination, in a case where P cell connection is executed by using a carrier that belongs to a high-frequency band (step S107, Yes), a frequency band of a signal that is transmitted with a large transmission power from the main antenna is a high-frequency band, and hence, power of a signal in a high-frequency band that is received by the sub-antenna is large.

For this reason, the gain determination unit 202 determines that attenuation on the variable gain LNA 201H that corresponds to a high-frequency band is needed, and determines that a gain of the variable gain LNA 201H is caused to be a gain that is less than or equal to the predetermined value and a gain of the variable gain LNA 201L is caused to be comparatively large (step S203). The gain determination unit 202 generates a gain control signal that causes a gain of the variable gain LNA 201H to be a small gain that is less than or equal to the predetermined value and causes a gain of the variable gain LNA 201L to be a comparatively large gain suitable for amplification, so that gains of the variable gain LNAs 201H and 201L are set. Thereby, among signals received from the sub-antenna, a signal of a carrier in a high-frequency band is input to the variable gain LNA 201H and attenuated, and a signal of a carrier in a low-frequency band is input to the variable gain LNA 201L and amplified with low noise. As a result, reception quality with respect to a signal of a carrier in a low-frequency band is improved so that a throughput can be improved, and deterioration of reception quality with respect to a signal of a carrier in a high-frequency band that is caused by power saturation can be suppressed.

On the other hand, in a case where P cell connection is executed by using a carrier that belongs to a low-frequency band (step S107, No), a frequency band of a signal that is transmitted with large transmission power from the main antenna is a low-frequency band, and hence, power of a signal in a low-frequency band that is received by the sub-antenna is large.

For this reason, the gain determination unit 202 determines that attenuation on the variable gain LNA 201L that corresponds to a low-frequency band is needed, and determines that a gain of the variable gain LNA 201L is caused to be a gain that is less than or equal to the predetermined value and a gain of the variable gain LNA 201H is caused to be comparatively large (step S204). The gain determination unit 202 generates a gain control signal that causes a gain of the variable gain LNA 201L to be a small gain that is less than or equal to the predetermined value and a gain of the variable gain LNA 201H is caused to be a comparatively large gain suitable for amplification, so that gains of the variable gain LNAs 201H and 201L are set. Thereby, among signals received from the sub-antenna, a signal of a carrier in a low-frequency band is input to the variable gain LNA 201L and attenuated, and a signal of a carrier in a high-frequency band is input to the variable gain LNA 201H and amplified with low noise. As a result, reception quality with respect to a signal of a carrier in a high-frequency band is improved so that a throughput can be improved, and deterioration of reception quality of a signal of a carrier in a low-frequency band that is caused by power saturation can be suppressed.

Such determination of gains of the variable gain LNAs 201H and 201L is executed in units of frames of a received signal, and as determination for one frame is completed, whether or not a next frame is present in the received signal is determined (step S104). As a result of such determination, in a case where a next frame is present (step S104, Yes), determination of gains of the variable gain LNAs 201H and 201L based on conditions of radio communication is repeated. In a case where a next frame is absent in the received signal (step S104, No), the process is ended.

As described above, according to the present embodiment, a variable gain LNA for each frequency band is arranged in front of a bandpass filter for each carrier in a receiving circuit of a sub-antenna. In a case where transmission power from a main antenna is large, a gain of a variable gain LNA for a frequency band where a carrier that is used for transmission belongs thereto is caused to be small so that a signal is attenuated, and a received signal is amplified by only a variable gain LNA for a frequency band where transmission power from the main antenna is small. For this reason, a received signal can be amplified at a stage with a small cumulative NF in a receiving circuit of a sub-antenna, without causing power saturation in a variable gain LNA, so that a throughput can be improved at a time of carrier aggregation.

According to one aspect of a radio apparatus and a receiving method as disclosed in the present application, an advantage is provided that a throughput can be improved at a time of carrier aggregation.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio apparatus comprising:
    a first antenna that transmits and receives a radio signal;
    a second antenna that receives a radio signal;
    a plurality of filters that acquire signals with mutually different frequencies from a received signal that is received by the second antenna;
    an amplification unit that is arranged in front of the plurality of filters and amplifies the received signal; and
    a control unit that controls whether or not the received signal is amplified by the amplification unit depending on a condition of radio communication by the first antenna and the second antenna.

2. The radio apparatus according to claim 1, wherein the control unit includes
    a bypass switch that bypasses the amplification unit, and
    a bypass determination unit that determines whether or not the received signal is caused to bypass the amplification unit based on transmission power of a radio signal that is transmitted from the first antenna and information that indicates whether or not carrier aggregation that uses a plurality of carriers with mutually different frequencies is executed, and controls the bypass switch.

3. The radio apparatus according to claim 2, wherein
    the bypass determination unit determines that the received signal is caused to bypass the amplification unit in a case where the transmission power of the radio signal that is transmitted from the first antenna is greater than a predetermined threshold and the carrier aggregation is executed.

4. The radio apparatus according to claim 1, wherein
    the amplification unit amplifies the received signal with a variable gain, and
    the control unit includes a gain determination unit that determines a gain of the amplification unit based on transmission power of a radio signal that is transmitted from the first antenna and information that indicates whether or not carrier aggregation that uses a plurality of carriers with mutually different frequencies is executed.

5. The radio apparatus according to claim 4, wherein
    the gain determination unit sets a gain that attenuates the received signal on the amplification unit in a case where the transmission power of the radio signal that is transmitted from the first antenna is greater than a predetermined threshold and the carrier aggregation is executed.

6. The radio apparatus according to claim 1, further comprising
    a separation unit that separates the received signal that is received by the second antenna into a plurality of signals in mutually different frequency bands, wherein
    the amplification unit includes a plurality of amplifiers that are arranged just behind the separation unit and respectively amplify the signals in different frequency bands that are output from the separation unit, and
    the control unit controls presence or absence of amplification by each of the plurality of amplifiers depending on a frequency band where a radio signal that is transmitted from the first antenna belongs thereto.

7. The radio apparatus according to claim 6, wherein
    the control unit prevents an amplifier that amplifies a signal in a frequency band where a radio signal that is transmitted from the first antenna belongs thereto from amplifying the signal while causing an amplifier that amplifies a signal in another frequency band to amplify the signal.

8. A receiving method by a radio apparatus that includes a first antenna that transmits and receives a radio signal and a second antenna that receives a radio signal, the receiving method comprising:
    receiving a radio signal by the second antenna;
    determining whether or not the received signal received by the second antenna is amplified depending on a condition of radio communication by the first antenna and the second antenna; and
    controlling, in accordance with a result at the determining, presence or absence of amplification of the received signal by an amplification unit arranged in front of a plurality of filters that acquire signals with mutually different frequencies from the received signal.

* * * * *